(12) United States Patent
Üstünel et al.

(10) Patent No.: US 12,053,011 B2
(45) Date of Patent: Aug. 6, 2024

(54) EXTRUSION

(71) Applicant: N.V. Nutricia, Zoetermeer (NL)

(72) Inventors: Memet Ali Üstünel, Utrecht (NL); Raoul Charles Johan Moonen, Utrecht (NL)

(73) Assignee: N.V. Nutricia, Zoetermeer (NL)

( * ) Notice: Subject to any disclaimer, the term of this patent is extended or adjusted under 35 U.S.C. 154(b) by 400 days.

(21) Appl. No.: 16/771,759

(22) PCT Filed: Dec. 13, 2018

(86) PCT No.: PCT/NL2018/050840
§ 371 (c)(1),
(2) Date: Jun. 11, 2020

(87) PCT Pub. No.: WO2019/117722
PCT Pub. Date: Jun. 20, 2019

(65) Prior Publication Data
US 2021/0251274 A1 Aug. 19, 2021

(30) Foreign Application Priority Data

Dec. 13, 2017 (WO) ................ PCT/NL2017/050835

(51) Int. Cl.
| | | |
|---|---|---|
| A23P 30/20 | (2016.01) | |
| A23L 3/16 | (2006.01) | |
| A23L 33/00 | (2016.01) | |
| A23L 33/115 | (2016.01) | |
| A23L 33/125 | (2016.01) | |
| A23L 33/19 | (2016.01) | |
| A23L 33/21 | (2016.01) | |

(52) U.S. Cl.
CPC ............... *A23P 30/20* (2016.08); *A23L 3/16* (2013.01); *A23L 33/115* (2016.08); *A23L 33/125* (2016.08); *A23L 33/19* (2016.08); *A23L 33/21* (2016.08); *A23L 33/40* (2016.08); *A23V 2002/00* (2013.01)

(58) Field of Classification Search
CPC ........... A23V 2250/54252; A23V 2250/54246; A23V 2250/5488; A23V 2250/548; A23V 2300/16; A23L 33/40; A23L 33/185; A23L 1/29; A23L 1/01; A23L 1/00; A23L 33/17; A23L 33/115; A23L 33/125; A23P 1/12; A23P 1/02; A23P 10/40; A23P 30/20; A23J 3/14; A23C 9/16; A23C 9/18; A23C 3/02; A23C 3/07

See application file for complete search history.

(56) References Cited

U.S. PATENT DOCUMENTS

| | | |
|---|---|---|
| 2008/0241337 A1 | 10/2008 | Clextral |
| 2014/0228429 A1 | 8/2014 | Funda et al. |
| 2015/0305394 A1* | 10/2015 | Mazer ............... A23L 33/40 426/72 |
| 2017/0202864 A1 | 7/2017 | Lab |

FOREIGN PATENT DOCUMENTS

| | | | |
|---|---|---|---|
| WO | 2006094995 | 9/2006 | |
| WO | 2011159653 | 12/2011 | |
| WO | 2014066680 | 5/2014 | |
| WO | 2014093832 | 6/2014 | |
| WO | 2014164956 | 10/2014 | |
| WO | WO-2016014500 A1 * | 1/2016 | ............. A23L 33/40 |

* cited by examiner

*Primary Examiner* — Hong T Yoo
(74) *Attorney, Agent, or Firm* — N.V. Nederlandsch Octrooibureau

(57) ABSTRACT

The present invention concerns a process for manufacturing an infant formula product involving: (a) subjecting an aqueous mixture having a protein component and a carbohydrate component to a heat treatment step; (b) mixing the aqueous mixture with a lipid component; (c) subjecting the aqueous mixture having the lipid component, the carbohydrate component and the heat-treated protein component to a homogenization and emulsification step to obtain a homogenized oil-in-water emulsion having a total solids content in the range of 45-73 wt %; (d) conveying the homogenized emulsion into an extruder, independently adding digestible carbohydrates and optionally dietary fibres to the extruder and extruding the contents of the extruder to obtain an extruded material; (e) preparing an infant formula product from the extruded material. The invention further concerns an infant formula product obtainable by the process according to the invention and to a modular system suitable for performing the process according to the invention.

16 Claims, 1 Drawing Sheet

EXTRUSION

FIELD OF THE INVENTION

Figure 1:
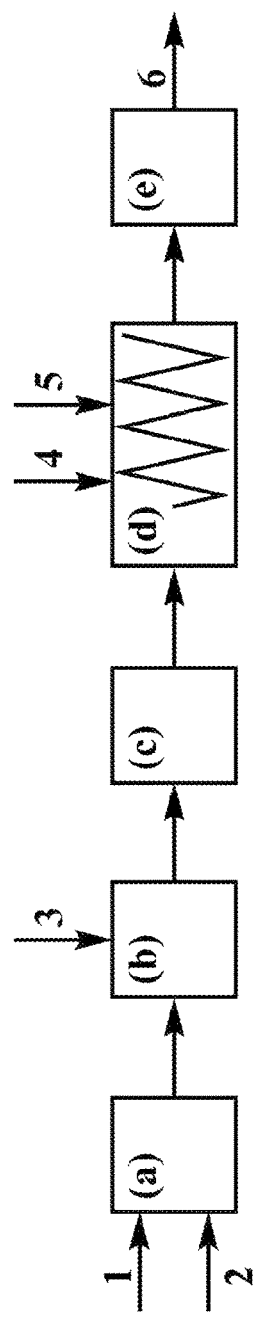

The present invention relates to a process for manufacturing nutritional composition, in particular infant formula products thereof, by extrusion, to the nutritional compositions obtained thereby and to a modular system suitable for performing the process according to the invention.

BACKGROUND ART

Powdered nutritional compositions containing a protein component, a fat component and a carbohydrate component are well known. They are intended to be reconstituted prior to consumption with a liquid, typically. Powdered nutritional compositions include infant formulae, growing-up milks and compositions used in clinical nutrition, for example for enteral feeding. Conventionally, such products are manufactured by mixing all the ingredients with water, subjecting the liquid mixture to a thermal treatment to reduce bacterial loads, homogenising the mixture and then subjecting it to spray-drying.

Extrusion methods are highly efficient methods that significantly minimize the amount of water and energy needed and typically produce extrudates that can be dried and ground into powdered material. To date, the use of extrusion processes to produce powdered infant formulae is only very limited, see for example WO 2006/094995, WO 2011/15965653, WO 2014/066680, WO 2014/164956 and US 2008/241337. The present inventors have developed an extrusion-based process for the manufacture of infant formulae, which is cost efficient and produces excellent products.

SUMMARY OF THE INVENTION

The inventors have developed a process for the manufacture of infant formulae products using extrusion. In the process according to the invention, the concentrations of the aqueous streams are carefully controlled, such that each of the necessary and preferred steps are performed optimally and at the same time the amount of water that is added and the need for it to be removed afterwards to obtain a dry infant formula is minimized.

Furthermore, the process according to the invention is efficient in terms of energy consumption and water use. The amount of water used to dissolve components or dilute streams is minimized and avoided where possible. As such, energy-consuming removal of water to obtain the final dry powders is also minimized.

A further advantage of the process according to the invention is that it provides little disruption of existing manufacturing processes for infant formula products wherein extrusion is not used, such that it is readily retrofitted into existing processing plants. Limited adaptation is required in terms of hardware configuration and machinery used in conventional processes that include a spray-drying step. Also, the process according to the invention is highly versatile when it comes to starting materials, and operates efficiently when the conventional starting materials for infant formula product manufacture are used. Furthermore, the process according to the invention is very well capable of taking (natural) variations in the composition of starting materials into account, since prior to the homogenisation step as used, the levels of the relevant ingredients can be monitored and adjusted as desired. Furthermore, capex costs expressed as the capital expenditure per kilogram product manufactured by the method according to the invention is very favourable.

The process of the present invention reduces the heat-load exerted on the protein component to a minimum by keeping temperatures desirably low at all stages. As such, the obtained infant formula product mimics the golden standard set by human milk to a better extent than infant formula products that are subjected to higher temperatures during processing, especially to higher extrusion temperatures.

A further advantage of the process according to the invention is that both heat-treated and non-heat treated proteins can be used as starter material as they can enter the process at different phases. Yet, proteins enter the process by contacting them with a liquid stream such that they form an integral part of the end product by forming a protective layer that surrounds the lipid component and/or by forming part of lipid-containing particles instead of being present in the infant formula product as separate particles. This is of particular relevance in preventing oxidisation of lipids via reduced exposure to air.

Also, the present process allows highly concentrated ingredients to be used in a wet mix process thereby minimizing use of water yet preventing fouling of equipment to occur.

Thus, the present invention provides a flexible, balanced yet efficient infant formula extrusion-based manufacturing process capable of using readily available ingredients, wherein a heat treatment step is performed on as much of the required proteins but with exclusion of as much of the required lipids and carbohydrates as possible, yet providing room for adding ingredients during the extrusion step if needed. Such flexibility is a benefit in view of different recipes an infant manufacturing plant is supposed to produce to tailor the demanding market and supply the full gamma of products sold using a processing line that is as straight forward and basic as possible.

The infant formulae products obtained by the process according to the invention show desirable reconstitution (dissolution) behaviour without undesirable lumping or sticking. The process of the invention provides a nutritional composition that is easily dispersible upon mixing with a liquid, typically water, to give a homogeneous liquid mixture of protein, fat and carbohydrate without visible separation of an aqueous and a non-aqueous phase.

Further, desirable low levels of free fat in the infant formula product are achieved by the process of the present invention.

DETAILED DESCRIPTION

The process according to the invention is for manufacturing an infant formula product and comprises the following steps:
 (a) subjecting an aqueous mixture having a protein component and a carbohydrate component to a heat treatment step,
 (b) mixing the aqueous mixture with a lipid component,
 (c) subjecting the aqueous mixture comprising the lipid component, the carbohydrate component and the heat-treated protein component to a homogenization and emulsification step to obtain a homogenized oil-in-water emulsion having a total solids content in the range of 45-73 wt %;
 (d) conveying the homogenized emulsion into an extruder, independently adding digestible carbohydrates (e.g. lactose) and optionally dietary fibres to the extruder and extruding the contents of the extruder to obtain an extruded material;

(e) preparing an infant formula product from the extruded material.

In one embodiment, the mixing in step (b) directly follows the heat treatment of step (a), meaning this occurs without substantial alteration of the heat treated aqueous mixture. In one embodiment, a step of increasing the total solid content of the aqueous mixture directly follows the heat treatment of step (a), meaning this occurs without substantial alteration of the heat treated aqueous mixture. In one embodiment, the mixing in step (b) directly follows a step of increasing the total solid content of the aqueous mixture, meaning this occurs without substantial alteration of the aqueous mixture with increased total solid content. In one embodiment, the homogenization and emulsification in step (c) directly follows the mixing of step (b), meaning this occurs without substantial alteration of the aqueous mixture. In one embodiment, the extrusion in step (d) directly follows the homogenisation of step (c), meaning this occurs without substantial alteration of the homogenized emulsion. In one embodiment, the preparing of step (e) directly follows the extrusion of step (d), without substantial alteration of the extruded material.

In one embodiment, the process according to the invention does not contain a spray-drying step.

In one embodiment, the process according to the invention does not exceed the temperature of 75° C., preferably 70° C., with the exception of the heat treatment of step (a). The nutrients ending up in the infant formula product are preferably not unnecessarily exposed to an undesirably high heat load.

Preferably, the infant formula product is an infant formula, a follow-on formula, a toddler milk or a growing-up milk.

In the context of the present invention, aqueous mixtures are yielded at many stages, and used again at later stages. Such aqueous mixtures are mixtures based on water as liquid, wherein further components may be dissolved or dispersed. In the process according to the invention, the aqueous mixture undergoes several treatments, but all these times remains an aqueous mixture, until the extrusion step takes place, wherein the mixture is converted into dry extrudates. Aqueous mixture may also be referred to as "aqueous stream" or merely "stream". Throughout the process, the concentration of the aqueous mixture may be defined by their total solids content. This is given in wt %, based on the total weight of the stream. "Solids", "Total Solids" or "Total Solids Content" refers to all components of the aqueous stream with the exception of water, even these solids are in liquid state at ambient conditions, such as oils.

Starting Materials and Heat Treatment Step (a)

One step in the method of the invention is step (a) wherein an aqueous mixture having a protein component and a carbohydrate component is subjected to a heat treatment step.

The aqueous mixture having a protein and carbohydrate component is preferably composed of conventional and widely available starting materials or sources which may be selected from skim milk, whey protein concentrates (WPC), whey protein isolations (WPI), milk protein isolates (MPI), milk protein concentrates (MPC), demineralized whey protein powder, skimmed milk concentrates with any suitable protein level and preferably micronutrients. The starting materials comprising the protein component are preferably non-heat treated due to the inclusion of a heat treatment step in the process of the present invention providing a first flexibility in the choice of the protein-containing starter material. Typically, the protein sources used to provide the protein component are thus not of pure grade or high grade but contain lactose as this is present as an ingredient in these milk protein sources. Thus, in a preferred embodiment, the starting materials used in step (a) do not include a lactose source that does not contain substantial amounts of milk proteins. In other words, the starting materials of step (a) do not include lactose with a purity of more than 92 wt %, preferably more than 90 wt %, more preferably more than 85 wt %, based on dry weight since such lactose sources, such as refined lactose is of high food grade and are preferably added as such in the process of the invention during the extrusion step (d). If desirable to add, also maltodextrin is most preferably not added in step (a) but downstream, such as during extrusion step (d) or a dry blending step following extrusion to allow the proteins levels on the dry weight basis to be as high as possible during the heat treatment.

In a preferred embodiment, the carbohydrate component added in step (a) comprises or consists of digestible carbohydrates that are naturally occurring in bovine milk, preferably monosaccharides and/or disaccharides. More preferably, the carbohydrate component comprises lactose as this is a highly preferred component of infant formulae and naturally occurring in bovine milk.

In a preferred embodiment, the amount of lactose contained in the carbohydrate component of step (a) constitutes between 15 and 75 wt % of the total lactose contents of the infant formula product produced by the present method, on dry weight basis. More preferably, this amount of lactose in step (a) lies between 20 to 70 wt % or 22 to 65 wt % of the total lactose contents of the infant formula product produced by the present method, on dry weight basis. Any remaining lactose to be included in the infant formula product is preferably added in step (d) and/or (e), most preferably at least 20, 40 or 50 wt % of the remaining lactose to be added is added via step (d).

In a preferred embodiment, the weight ratio of protein to carbohydrate of the aqueous mixture lies in the range of 1.0 to 0.01, more preferably in the range of 0.5 to 0.05, most preferably in the range of 0.2 to 0.1. The weight ratio of protein to carbohydrate of the aqueous mixture is based on the aim to manufacture an infant formula and takes into account that lactose can be added further downstream of the process, i.e. during the extrusion step (d) and/or to the extruded material in step (e).

Typically, a whey protein source, preferably skim milk, WPC and/or WPI, and a casein source, preferably a milk protein source, more preferably MPI and/or MPC, are blended to obtain a protein mixture. The ratio at which the whey protein source and the milk protein source are blended depends on the desired product to be manufactured, and typically is in the range of whey protein to casein of 9/1 to 1/9, preferably 5/1 to 1/5, more preferably 3/1 to 1/1, most preferably about 6/4. Alternatively, the ratio at which the whey protein source and the milk protein source are mixed is in the range of 1/9-1/9, more preferably in the range 1/2-2/1, most preferably about 1/1, based on weight of the protein fraction in each of the sources.

In a preferred embodiment, the amount of proteins included in step (a) constitutes between of 70 and 100 wt % of total protein that is present in the infant formula obtained by the present invention, on a dry weight basis. Preferably, said protein amount lies between 80 and 100 wt %, more preferably between 90 or 95 and 100 wt %. Adding such high amounts of protein already during step a) ensures even and good emulsification of proteins and oils in the oil-in-water emulsion further downstream the process and entrapment of oils by proteins.

Typically, water-soluble micronutrients as typical in the art of infant formula manufacture, like vitamins and minerals, are added to the aqueous mixture of step (a). Although one or more of the ingredients could be in dry form, it is preferred that they are in liquid form, preferably concentrated, form. As such, limited unnecessary water removal has to be performed as a consequence of the inclusion of these vitamins and minerals as a concentrate or dry powder. Including these micronutrients already in step a) has the advantage that they become fully integrated in the powder particles that constitute the product as obtained.

The starting materials are preferably used in liquid form or dissolved in a batch-wise manner to provide the aqueous mixture to control uniformity and concentration of ingredients of the produced products.

In step (a), the aqueous mixture having a protein component and a carbohydrate component is subjected to a heat treatment step. Preferably, the aqueous mixture is fully dissolved and of a uniform concentration before being subjected to the heat treatment. Preferably, the aqueous mixture is obtained by batch-wise dissolution in case the starting materials, such as skim milk and/or whey protein concentrate, are sourced for infant formula production in dry form. The process according to the invention is perfectly suitable for large scale manufacture. Thus, in one embodiment, the aqueous mixture is fed to the heat treatment of step (a) at a flow rate in the range of 500-25000 kg/h, preferably in the range of 1000-10000 kg/h, most preferably in the range of 2500-6000 kg/h.

The aqueous mixture comprising the protein component and the carbohydrate component is subjected to a heat treatment in step (a) that is designed obtain a microbial safe protein component and infant formula product with good shelf-life. Any suitable type of heat treatment known in the art may be employed, e.g. pasteurization or sterilization, such as HTST, ESL, UHT, dry heat or moist heat sterilization. The heat treatment as meant herein has the purpose of reducing the microbial load to such an extent that the resulting infant formula product is free from microorganisms and safe for consumption by infants. In particular, it is safe with regards to *Bacillus cereus* and *Enterobacter sakazakii*, for instance, such as laid down in European Regulation No 2073/2005 dated 2007, corrigendum No. 1441/2007.

Advantageously, as opposed to dry mixing based processes wherein no heat treatment on aqueous streams is needed, the aqueous mixture comprising the protein component is heat-treated as an integral part of the process of the present invention. Hence, the incoming protein component can thus be of a more variable grade or quality. One advantage of performing this integrated heat treatment step on an industrial scale is that it becomes possible to better control and steer towards microbial safety and to prevent recontamination from sourced protein components to occur. It is noted that spray-drying is usually, and herein, not considered to be a microbiocidal step.

The heat treatment is preferably performed on an aqueous mixture having a total solids content of 15-40 wt %, preferably 20-35 wt %, more preferably 18-32 wt %, most preferably about 25-32 wt %. At such concentration, the heat treatment is most optimally performed because of optimal further handling of the aqueous mixture during and after the heat treatment step, but also in the mixing tank used to obtain the aqueous mixture before it can be heat treated. The total solids content of the mixture in step (a) is the consequence of finding a balance between prevention of fouling of equipment, like mixing tanks, conduits etc., at too high total solids content and preventing unnecessary removal of excess water at steps downstream of the heat treatment.

The aqueous mixture in step (a) is subjected to the heat treatment prior to mixing it with the lipid component in step (b) to allow working at the most optimal high total solid levels and protein levels implying operating under conditions of elevated viscosities. Furthermore, exclusion of the lipid component from the heat treatment in step (a) means less energy is consumed by the process of the present invention.

Preferably, a lipid component is not actively added as a pure, single ingredient in step (a). It may be present in low amounts in the aqueous mixture subjected to step (a) since lipids may be present in the sources used for the protein component and the carbohydrate component. The process is fully operable when lipids are present from step (a) onwards.

Optional Concentration Step of the Heat Treated Aqueous Mixture

After heat treatment but preferably prior to addition of the lipid component, the aqueous mixture may be concentrated. Concentration may be accomplished by any means known in the art, such as (partial) evaporation or filtration. In one embodiment, the aqueous mixture obtained in step (a) is subjected to partial evaporation of water, preferably at reduced pressure and relatively low temperature. Preferably, the concentration is performed such that the concentrated aqueous mixture, prior to addition of the lipid blend, is the range of 35-60 wt % total solids, preferably 35-55 wt % total solids, more preferably 40-55 wt % total solids, more preferably 40-51 wt % total solids, most preferably 45-51 wt % total solids. The inventors found that such concentration gives, after addition of lipids, an optimal concentration prior to execution of the homogenisation and extrusion steps. If concentration occurs after addition of the lipid blend, the final concentration may be somewhat higher to still feed the extruder with a composition having a solids content of 45-73 wt % total solids, preferably 53-68 wt % total solids, most preferably 60-65 wt % total solids.

Thus, in a preferred embodiment, the total solids content of the aqueous mixture obtained in step (a) is increased, preferably by an evaporation step, prior to mixing with the lipid component. In one embodiment, the amount of water removed in the concentration step, preferably to in the evaporator, is in the range of 200-10000 kg/h, preferably in the range of 800-5000 kg/h, most preferably in the range of 1500-2500 kg/h.

Mixing-In of the Fat Component in Step (b)

In mixing step (b), the aqueous mixture obtained in step (a) is mixed with a lipid component. The mixing can take place in any suitable way, preferably comprising an in-line injection system. In one embodiment, the aqueous mixture is fed to step (b) at a flow rate in the range of 300-20000 kg/h, preferably in the range of 800-10000 kg/h, most preferably in the range of 1500-5000 kg/h. The lipid component to be added during step (b) is preferably fed to step (b) at a similar flow rate, thus in the range of 300-20000 kg/h, preferably in the range of 800-10000 kg/h, most preferably in the range of 1500-5000 kg/h. Although the temperature at which step (b) is performed is not crucial in the context of the present invention, it is preferred that the temperature of step (b) is in the range of 30-75° C., more preferably in the range of 50-70° C., most preferably in the range of 55-65° C.

A lipid component is added prior to homogenisation and emulsification. This lipid component typically contains the essential and preferred lipids for infant formula manufacture, as known in the art. Preferably, it also contains the lipid-soluble vitamins. Although the lipid component may be added at any point prior to homogenisation, it is added after the heat treatment step. This is because addition of the lipid component raises the total solid content of the mixture which is not desirable prior to the heat treatment step. This way, most of the space in terms of solids content which is available in the mixture that is heat-treated in step (a) is taken up by the protein component thus avoiding unnecessary inclusion of the lipid component at that stage of the process.

Mixing of the lipid component in step (b) causes an increase in the total solids content of between 5 and 25 wt %, preferably 9 to 20 wt %, more preferably 12 to 18 wt %.

After mixing of the lipid component in step (b), a composition having a total solids content in the range of 45-73 wt % is obtained. Preferably, said composition has a total solids content in the range of 53-73 wt %, such as 60-73 wt %, more preferably in the range of 53-68 wt %, preferably in the range of 60-65 wt % after mixing in the lipid component.

Preferably, fat-soluble vitamins are included in the lipid component as it is mixed in step (b).

Step (c) Homogenisation and Emulsification to Obtain an Oil-In-Water Emulsion

In step (c), the aqueous mixture comprising the lipid component, the carbohydrate component and the heat-treated protein component is subjected to homogenization and emulsification to obtain a homogenized oil-in-water emulsion having a total solids content in the range of 45-73 wt %, preferably in the range of 53-73 wt %, such as 60-73 wt %, more preferably in the range of 53-68 wt % total solids, most preferably in the range of 60-65 wt % total solids. Such concentrations are especially desirable for the following extrusion step, wherein the solids content should not exceed the indicated upper limit due to constraints of equipment used to handle the oil-in-water emulsion and not fall below the lower limit because too much water will have to be removed downstream. In one embodiment, the aqueous mixture is fed to step (c) at a flow rate in the range of 800-40000 kg/h, preferably in the range of 2000-20000 kg/h, most preferably in the range of 3000-7500 kg/h.

The aqueous mixture subjected to step (c) preferably contains substantially all lipids of the final product. The aqueous mixture typically contains carbohydrates, such as lactose originating from the whey protein source and/or the milk protein source, but the inventors have found that additionally required lactose may be added during extrusion in step (d).

The incoming aqueous mixture contains both casein and whey protein, preferably in the ratio desired for the final product, which is preferably in the range of whey protein to casein of 9/1 to 1/9, preferably 5/1 to 1/5, more preferably 3/1 to 1/1, most preferably about 6/4. Having both whey protein and casein present prior to homogenisation was found to be advantageous, as the proteins are as such homogeneously distributed in the emulsion after homogenisation already, preferably prior to extrusion, and eventually in the obtained infant formula product.

One advantage of obtaining a homogeneous oil-in-water emulsion before extrusion is started, is that a uniform distribution of nutrients is obtained throughout the composition which is easier to achieve than by relying on an extrusion step for the homogenisation and emulsification. Also, this order of steps ensures that the emulsion thus obtained contains lipids that are protected by a protein layer. Such protection is important since dry infant products need to be consistent in composition and stable for a long time. Importantly, the presence of free fat (or non-encapsulated fat) is reduced to a minimum before extrusion takes place and which is not altered during extrusion. Thus, already at an upstream, early phase of the process, the ingredients of the infant formula are safeguarded from becoming rancid and oxidation following unnecessary exposure to air.

Homogenisation of aqueous mixtures containing a protein component, a lipid component and a carbohydrate component is known in the art, and the exact conditions at which homogenisation is performed are also known with the skilled person.

Preferably, homogenisation is performed at a temperature between 50 and 80° C., preferably between 54 and 76° C., more preferably between 60 and 70° C. and preferably within 5 seconds, more preferably less than 3 seconds. The indicated ranges ensure minimised protein modifications and degradation of heat labile components, but sufficiently high to still be able to properly perform step (c) on a product with good viscosity.

In a preferred embodiment, the total solids content obtained during steps (a) and (b) are 15-40 wt %, preferably 20-35 wt %, most preferably about 25-32 wt % after step (a) and 45-73 wt %, preferably 53-68 wt %, or more preferably 60-65 wt % after step (b) wherein the total solids increase in step (b) is due to addition of lipids and optionally by the inclusion of a concentration step prior to lipid addition. Importantly, the extruder is fed with a homogenized oil-in-water emulsion having a total solids content in the range of 45-73 wt %.

In one embodiment, the oil-in-water emulsion has a viscosity of between 10 and 300 mPa·s$^{-1}$, preferably the viscosity lies between 20 and 260 mPa·s$^{-1}$, more preferably the viscosity lies between 50 and 240 mPa·s$^{-1}$, most preferably the viscosity lies between 80 and 220 mPa·s$^{-1}$.

The viscosity as meant herein is measured at 70° C. with a shear rate of $1/1000$ s since this temperature is representative for the conditions in the extruder allowing one to mimic these conditions on a laboratory scale to quickly assess the behaviour of a particular infant formula under investigation.

The can be measured using any suitable apparatus. For avoidance of doubt, herein the viscosity is measured using an Anton Paar® Physica MCR301 with cone plate probe (cone angle 1°), probe number CP50 1 4310, for measurements at the indicated conditions. Briefly, the viscosity measurement follows a first stepped flow wherein the shear rate is increased from 1 s$^{-1}$ to 1000 s$^{-1}$ after which the viscosity is measured in a peak hold step for five times at shear rate 1000 s$^{-1}$ at 70° C. and the average value is taken using the indicated apparatus.

Step (d) Extrusion of the Oil-In-Water Emulsion

The homogenized oil-in-water emulsion is conveyed or transported into an extruder and independently of the emulsion, the digestible carbohydrates (e.g. lactose) and optionally dietary fibres are added to the extruder, and the contents of the extruder are extruded to obtain an extruded material.

Independent addition of digestible carbohydrates is herein defined as addition in the extruder via an inlet that is not used to feed the oil-in-water emulsion in the extruder. Independent addition of dietary fibres herein is defined as addition in the extruder via an inlet that is not used to feed the oil-in-water emulsion in the extruder. Even though digestible carbohydrates and carbohydrates may be added together via a single inlet to the extruder, they are preferably added via separate inlets.

Extrusion is well-known in the art, and any means known to the skilled person can be used. Preferably extrusion is performed at a temperature below 75° C., more preferably below 70° C., such as 50-75° C., more preferably 60-70° C., most preferably 62-68° C. Above these temperatures, proteins may become unnecessarily modified which is undesirable for infant formula. The inventors found that the indicated temperature range does not hamper the properties of the final product.

Typically the oil-in-water emulsion is entered into the extruder at one side of the extruder. Inside the extruder, it is forced forward by movement of a screw. The residence time inside the extruder is preferably between 30 seconds and 3 minutes, such as between 50 seconds and 2 minutes. Preferably though, the time is shortened compared to existing extrusion steps used in infant formula recipe production since the incoming stream is more homogenized and more complete in terms of the required final nutrient composition. Therefore, the more preferred residence time lies below 50 seconds, such as between 20 and 50 seconds. In one embodiment, the extruder operates at a flow rate in the range of 2000-60000 kg/h, preferably in the range of 5000-30000 kg/h, most preferably in the range of 7500-15000 kg/h.

The pressure exerted on the composition during extrusion preferably lies between 20 kPa and 10 MPa.

The oil-in-water emulsion that is fed in the extruder has a total solids content in the range of 45-73 wt % total solids, preferably in the range of 53-73 wt %, such as 60-73 wt %, more preferably in the range of 53-68 wt % total solids, most preferably 60-65 wt % total solids. The inventors have found that this concentration provides optimal results, both in terms of the final product characteristics as well in process efficacy. Notably, the amount of water that needs to be added to the aqueous mixture prior to the extrusion step is kept at a minimum, and yet the extrusion is performed optimally.

The inventors found that some solid material that is typically incorporated in the nutritional composition according to the invention can advantageously be added during extrusion. During infant formula manufacture, ingredients such as lactose and dietary fibres are typically added in solid form. Moreover, it is not crucial that all of the lactose and dietary fibres are present during homogenisation step (c) from a manufacturing point of view to obtain the final infant formula product. Hence, lactose and optionally also dietary fibres are added during extrusion.

In one embodiment, the amount of lactose that is added during step (d) lies between 0 and 70 wt %, preferably between 2 and 70 wt % (on dry weight basis), of the total amount of lactose contained in the infant formula obtained in step (e). Preferably, this amount lies between 0 and 50 wt % or between 25 and 50 wt %.

In an alternative embodiment, the amount of lactose that is added during step (d) lies between 0 and 40 wt %, preferably between 2 and 40 wt %, of the total dry weight of the infant formula obtained in step (e). More preferably, this amount lies between 0 and 30 wt %, most preferably between 2 and 30 wt %.

The digestible carbohydrates added in step (d) preferably comprise or consist of lactose and/or maltodextrin.

In a preferred embodiment, the digestible carbohydrates, such as lactose and/or maltodextrin that is fed into the extruder, are of (infant) food grade quality and have a purity of more than 90 wt %, preferably more than 95%. Purity herein refers to the presence of the intended ingredient in terms of dry weight, so expressly excluding water as in impurity. Because lactose and/or maltodextrin are added in dry form, significant amounts of water are prevented from entering the manufacturing process and are thus not required to be removed again afterwards. Managing the liquid streams thus becomes more efficient. Adding these ingredients during extrusion reduces the need for water addition and allows higher total protein solids to be present upstream the extrusion step.

The point of addition in the extruder of lactose and/or maltodextrin is preferably before the dietary fibres are added to aid dissolution of the digestible carbohydrates. Dietary fibres, like galactooligosaccharides, can be added at a later stage during extrusion since these fibres can be added as a concentrated liquid.

In one embodiment, some of the protein required for manufacturing an infant formula is added during extrusion. The process of the present invention allows for such flexibility to be present since all the lipids are already fully emulsified with the proteins in step (c). Preferably, between 0 and 30 wt % of the total protein component of the infant formula product is added during step (d), more preferably 0 to 20 or most preferably 0 to 10 wt % of total protein.

In a preferred embodiment, dry lactose powder and/or dry maltodextrin powder is added during extrusion.

In a preferred embodiment, the dietary fibres are added as a concentrated liquid or syrup, such as galactooligosaccharides.

In a preferred embodiment, the amount of digestible carbohydrates added, mainly lactose and/or maltodextrin and optionally the dietary fibres, is such that the total solids content of the material exiting the extruder lies in the range of 75-90 wt %, preferably 75-88 wt %, more preferably 80-88 wt %, most preferably 83-87 wt %.

The extruded material preferably contains substantially all proteins and/or lipids that are nutritionally required for an infant formula. In other words, no lipids and/or proteins need to be added to the extruded material. Dry blending with a further protein component, such as skimmed milk and the like, is thus not necessary thereby avoiding that the final product would have an undesirable broad or uneven particle size distribution caused by adding a product like skim milk. This way, a desirable uniform particle density distribution is obtained. Also, adding a milk protein source, or bovine milk protein source, at such a downstream part of the process disturbs the mineral composition due to the presence of minerals in such natural products.

In the context of the present invention, dietary fibres are synonymous to non-digestible oligo- and polysaccharides, most preferably galactooligosaccharides, fructooligosaccharides, fructopolysaccharides and mixtures thereof.

Step (e) Preparation of an Infant Formula from Extruded Material

The extrusion step affords an extruded material which comprises substantially all of the solids that have been added to the extruder, including the solids of the oil-in-water emulsion and any solids that are additionally added during extrusion. The extruded material may also be referred to as extruded mixture or extrudate and typically is in the form of small grains.

In a preferred embodiment, the extruded material is already nutritionally complete as it exits the extruder and qualifies nutritionally as an infant formula. In such cases, the preparing of step (e) comprises typical steps as drying, milling and/or packaging such that the extruded material is prepared to be sold as an infant formula product. Further nutritional adaptation is not required in such instance and not included in step (e).

Alternatively, preparing in step (e) further comprises some nutritional supplementation of the extruded material to arrive at a nutritionally complete infant formula product. Preferably, the nutritional supplementation comprises dry-blending of the missing nutrients or the missing amounts of nutrients. Alternatively, any required supplementation is done at an earlier stage of the process, e.g. prior to step (a), during the mixing of step (b) and/or during the extrusion of step (d), such that no further supplementation is required during step (e).

In one embodiment, this supplementation comprises addition of lactose and/or minerals and/or vitamins as possibly required to afford the nutritionally-complete formula.

In a preferred embodiment, digestible carbohydrates (preferably lactose, but also maltodextrin may be meant) and/or micronutrients are added to the extruded material to afford an infant formula. Adding lactose and/or maltodextrin to the infant formula product to afford the infant formula can advantageously be done using sources with sufficiently overlapping particle size distribution or a distribution that falls within the distribution of the extruded material, thereby not causing an unbalanced distribution which could negatively impact the powder particle properties and behaviour, such as flowability, which could be caused by adding a milk protein source at this stage of the process. The particle size distribution of commercially available lactose or maltodextrin is readily controlled by suppliers upon request and can easily be determined by the skilled person. The amount of lactose and/or maltodextrin added to the extruded material comprises between 0 and 40 wt % on dry weight basis of the final infant formula obtained, preferably between 0 and 30 wt %. Alternatively, the amount of lactose added to the extruded material comprises between 0 and 70 wt % based on total amount of lactose in the final infant formula obtained, more preferably between 0 and 50 wt %. For maltodextrin, the more preferred amount added to the extruded material comprises between 1 and 20 wt %, based on dry weight of the final infant formula obtained, preferably between 1 and 15 wt %.

The extruded material typically has a total solid content in the range of 75-90 wt %, preferably 75-88 wt %, more preferably 80-88 wt %, most preferably 83-87 wt %.

In a preferred embodiment, the extruded material is subjected to a drying step to further reduce the moisture content as part of step (e). Such drying may be performed by any means known in the art, such as flash drying, vacuum drying, microwave drying, IR drying. In one embodiment, the drying does not involve spray-drying. Such a drying step may operate at a flow rate of 2000-40000 kg/h, preferably 4000-20000 kg/h, most preferably 6000-12000 kg/h. The final moisture content after drying is preferably in the range of 0.5-5 wt %, preferably, 1-4 wt %, more preferably 2-3.5 wt %, most preferably 2.5-3 wt %, based on total weight of the product. Such low moisture content provides the infant formula product with a longer shelf-life, such as at least 12 months.

In a preferred embodiment, the extruded material, preferably the dried extruded material, is milled as part of step (e). Preferably, milling is performed such that a free-flowing powder is obtained.

Thus, the product of the process according to the invention is an infant formula product and preferably nutritionally complete when it exits the extruder. Preferably, the infant formula product is an infant formula, a follow-on formula, a toddler milk or a growing-up milk.

The nutritionally complete formula, or the infant formula product, is a dry powder that only requires reconstitution in the prescribed amount of water to achieve a ready-to-feed product suitable for being fed using a baby bottle.

The infant formula product according to the invention is in powdered form and is intended to be reconstituted with a liquid, typically water, in order to obtain an infant formula product that can be used to provide nutrition to infants. The powder is advantageously a free-flowing powder, such that it can easily be scooped and measured. The product according to the invention is readily dissolved in water at ambient temperature to prepare a ready-to-feed product for immediate consumption. The ready-to-feed products are stable for the time needed to be consumed by an infant, in particular they contain a stable emulsion. Furthermore, the presence of free fat is desirably low, typically below 2 wt % or even below 1.5 wt % or below 1 wt %, based on the total lipid content. As free fat is prone to oxidation during storage, its content is preferably as low as possible. Notably, the free fat content observed after the homogenisation step remains desirably low after the extrusion and further steps of the process according to the invention. These low free fat contents are determined on the final product.

Preferably, the product obtained by the present process is an infant formula. An infant formula herein is defined as a nutritionally complete formula, and includes infant formula (meant for infants of 0 to 6 months), a follow-on formula (meant for infants of 6 to 12 months), and a toddler milk or growing-up milk (meant for toddlers or young children of 1 to 3 years old).

The infant formulae according to the invention comprise or preferably consist of the essential macronutrients and micronutrients as set by law. Such requirements are typically laid down in regulatory bodies, such as EU directive 91/321/EEC and 2006/141/EC or US Food and Drug Administration 21 CFR Ch 1 part 107.

The infant formulae directly obtained or obtainable by the process according to the invention or the infant formulae obtained or obtainable by the process according to the invention is also part of the present invention.

Modular System for Carrying Out the Manufacturing Process of the Invention

A further aspect of the invention relates to a modular system for carrying out the method steps according to the appended claims for manufacturing an infant formula.

In this further aspect, the invention relates to a modular system for manufacturing an infant formula comprising:
- a heat-treatment module for heat-treating an aqueous mixture having a protein component and a carbohydrate component,
- a mixing module for mixing the aqueous mixture with a lipid component,
- a homogenization and emulsification module for subjecting the aqueous mixture comprising the lipid component, the carbohydrate component and the heat-treated protein component to homogenization and emulsification to obtain a homogenized oil-in-water emulsion,
- an extrusion module comprising an inlet for receiving the homogenized oil-in-water emulsion, a separate inlet for adding digestible carbohydrates and optionally dietary fibres into the extrusion module and an outlet for exiting of the extruded material,
- a drying module for drying the extruded material,
- and optional modules for milling and/or packaging the obtained material.

In a preferred embodiment, the aqueous mixture comprising the protein component and the carbohydrate component is subjected to a heat treatment step using a module that is designed to obtain a microbial safe protein component and infant formula product with good shelf-life. Any suitable type of heat treatment module known in the art may be employed, e.g. pasteurization, such as HTST, ESL or UHT, or sterilization, for example dry heat or moist heat sterilization.

In a preferred embodiment, the modular system comprises a module for concentrating the aqueous mixture obtained after step (a). Such concentration may be accomplished by any means known in the art, such as using (partial) evaporation or filtration module. In one embodiment, the aqueous mixture obtained in step (a) is subjected to partial evaporation of water, preferably at reduced pressure and relatively low temperature using a suitable module. Preferably, the concentration module is equipped or suited to concentrate the aqueous mixture, prior to addition of the lipid blend, to arrive at a concentration in the range of 35-60 wt % total solids, preferably 40-55 wt % total solids, most preferably 45-51 wt % total solids.

Thus, in a preferred embodiment, the total solids content of the aqueous mixture obtained in step (a) is increased, preferably using an evaporation module, which is included prior to the mixing module for mixing in the lipid component.

The modular system comprises a mixing module for carrying out mixing step (b) wherein the aqueous mixture obtained in step (a) is mixed with a lipid component. The mixing can take place in any suitable way, preferably a module comprising an in-line injection system. Preferably, the mixing module comprises means for heating the aqueous mixture obtained in step (a), the lipid component, or the mixture thereof, preferably at a temperature in the range of 30-75° C., more preferably in the range of 50-70° C., most preferably in the range of 55-65° C.

The mixing module for mixing in the lipid component is included prior to the homogenisation and emulsification module. Although the lipid component may be added at any point prior to homogenisation, it is included after or downstream of the heat treatment module.

The modular system of the invention includes a homogenization and emulsification module for carrying out step (c). It is capable of obtaining a homogenized oil-in-water emulsion having a total solids content in the range of 45-73 wt %, preferably 53-68 wt % total solids, most preferably 60-65 wt % total solids.

The homogenisation and emulsification module is configured to operate at a temperature between 50 and 80° C., preferably between 54 and 76° C., more preferably between 60 and 70° C. and to achieve a homogenized emulsion preferably within 5 seconds, more preferably less than 3 seconds. Furthermore, the homogenisation and emulsification module is preferably configured to operate with an oil-in-water emulsion having a viscosity of between 10 and 300 mPa·s$^{-1}$, preferably 20 and 260 mPa·s$^{-1}$, more preferably between 50 and 240 mPa·s$^{-1}$, most preferably between 80 and 220 mPa·s$^{-1}$.

The homogenized oil-in-water emulsion is conveyed or transported into an extrusion module. The module comprises an inlet for receiving the emulsion and independently thereof, an inlet for adding the digestible carbohydrates (e.g. lactose) and optionally an inlet for adding dietary fibres.

Suitable extrusion modules or extruders are well-known in the art and known to the skilled person. Preferably the extruder is equipped to operate at an extrusion temperature below 75° C., more preferably below 70° C., such as 50-75° C., more preferably 60-70° C., most preferably 62-68° C.

Typically, the oil-in-water emulsion enters the extruder at one side of the extruder and exits is as an extruded material at the opposite side such that it has gone through the full path of the extruder. Inside the extruder, the material contained therein is forced forward by movement of a screw. The extruder is equipped to operate with residence times of preferably between 30 seconds and 3 minutes, such as between 50 seconds and 2 minutes. Preferably though, shortened residence times of below 50 seconds, such as between 20 and 50 seconds should also be possible.

The extruder is furthermore preferably equipped to exert a pressure on the composition during extrusion that lies between 20 kPa and 10 MPa.

The extruder is preferably equipped to operate with oil-in-water emulsions that have a total solids content in the range of 45-73 wt % total solids, preferably 53-68 wt % total solids, most preferably 60-65 wt % total solids.

In a preferred embodiment, the modular system further comprises a dry blending module for dry blending ingredients into the material obtained before the infant formula is packaged.

Such dry blending module is only required in case the extruded material does not qualify nutritionally as an infant formula according to the invention but needs supplementation with powdered ingredients such as digestible carbohydrates, preferably lactose and/or maltodextrin.

In the modular system according to the invention, the separate modules are in fluid connection to allow passage of the material (the aqueous mixture or the infant formula product in preparation) from one module to another, to enable smooth operation of the modular system as a whole. In one embodiment, the modular system is for preparing the infant formula product according to the invention. In one embodiment, the modular system is for performing the process according to the invention.

FIGURES

Figure 2:
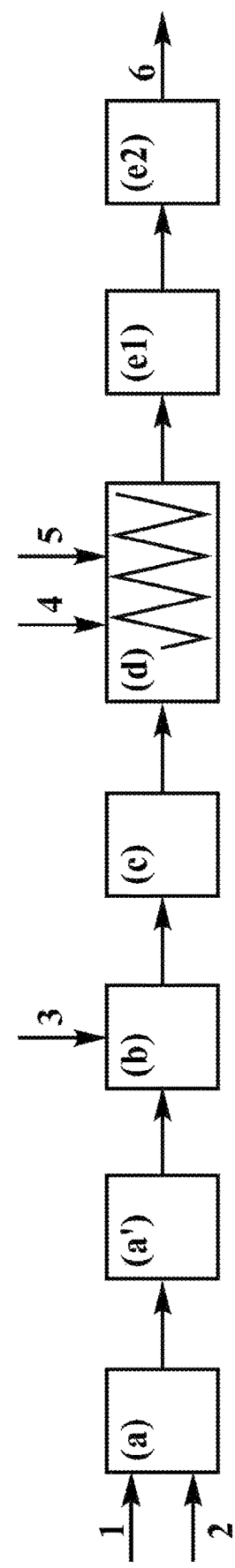

The invention is illustrated by FIGS. 1 and 2, depicting preferred embodiments of the process according to the invention.

FIG. 1 depicts a preferred embodiment of the process according to the invention, wherein (a), (b), (c), (d) and (e) represent steps (a), (b), (c), (d) and (e) as defined herein. (1)=introduction of a source of protein and digestible carbohydrate; (2)=optional introduction of a second source of protein and digestible carbohydrate; (3)=introduction of a lipid component (4) introduction of a digestible carbohydrate component; (5)=optional introduction of a dietary fiber component; (6)=discharge of the infant formula product.

FIG. 2 depicts a preferred embodiment of the process according to the invention, wherein (a), (b), (c) and (d) represent steps (a), (b), (c) and (d) as defined herein, (a') represents a step wherein the aqueous mixture is increased in total solid content as defined herein; (e1) represents a drying step as defined herein; and (e2) represents a milling step as defined herein. (1)=introduction of a source of protein and digestible carbohydrate; (2)=optional introduction of a second source of protein and digestible carbohydrate; (3)=introduction of a lipid component (4) introduction of a digestible carbohydrate component; (5)=optional introduction of a dietary fiber component; (6)=discharge of the infant formula product.

EXAMPLES

The following examples illustrate the invention.

Example 1

A process flow was generated for production of an infant formula intended for infants with an age of between 0 and 6 months. In a first step, demineralized whey (Demin Whey, flowrate 3166 kg/h), liquid whey protein concentrate 80 (WPC80, flowrate 430 kg/h), water (flowrate 677.2 kg/h) and the required amounts of micronutrients (i.e. vitamins and minerals) were compounded into an aqueous liquid with a total solids content (% TS) of 25 at a temperature of 35° C., and processed at a flowrate of 4419 kg/h.

The aqueous liquid was subsequently heat treated at 121.0° C. with a residence time of 2.89 seconds to achieve an $F_0$ of 2.4. After cooling, the heated solution is subsequently fed into an evaporator for concentration purposes during which water was removed at a flowrate of 1943.5 kg/h. After evaporation, the aqueous solution has a % TS of 44.6 and is conveyed with a flowrate of 2475.5 at a temperature of 60° C. to the oil injector. Oils necessary to produce the infant formula are injected into the aqueous stream at a flowrate of 2337.32 kg/h to reach a % TS of 71.5. The solution is subsequently fed into a homogenizer for homogenization and emulsification at 60° C. using a flowrate of 4812 kg/h. The homogenized oil-in-water emulsion is conveyed to the extruder.

During extrusion, whey protein concentrate (WPC35, flowrate 388.8 kg/h), whey protein concentrate powder (WPC80, flowrate 91.2 kg/h), skim milk powder (SMP, flowrate 1349.3 kg/h), lactose (1417.4 kg/h) and GOS (Vivinal GOS; concentrated liquid at 75 wt %, flowrate 1685.9 kg/h) were added. GOS is added as the final ingredient during the extrusion process. Extrusion is performed at 63° C. at a flowrate of 9745.6 kg/h. The extrudate as obtained contained 80% TS and was ready for drying using known technologies, such as flash or vacuum belt drying, to end up with a nutritional composition with a % TS of 97.5 which was produced at a flowrate of 7996.4 kg/h. No dry blending of further ingredients is required. A powdered composition was obtained that was ready for packaging.

Example 2

A process flow was generated for production of an infant formula intended for infants with an age of between 6 and 12 months. In a first step, liquid whey protein concentrate 35 (WPC35, flowrate 1019.4 kg/h), water flowrate 3140.7 kg/h) and the required amounts of micronutrients (i.e. vitamins and minerals) were compounded into an aqueous liquid with a total solids content (% TS) of 25 at a temperature of 35° C., and processed at a flowrate of 4236.5 kg/h. Protein content of the aqueous liquid was 8.44 wt %.

The aqueous liquid was subsequently heat treated at 121.0° ° C. with a residence time of 2.89 seconds to achieve an $F_0$ of 2.4. After cooling, the heated solution is subsequently fed into an evaporator for concentration purposes. After evaporation, during which water was removed with a flowrate of 1703.1 kg/h, the aqueous solution has a % TS of 41.8 and is conveyed with a flowrate of 2533.4 at a temperature of 60° ° C. to the oil injector. Oils necessary to produce the infant formula are injected with a flowrate of 2029.82 kg/h into the aqueous stream to reach a % TS of 67.69. The solution is subsequently fed into a homogenizer for homogenization and emulsification at 60° C. using a flowrate of 4563.2 kg/h. The homogenized oil-in-water emulsion is conveyed to the extruder.

During extrusion, skim milk powder (SMP, flowrate 1633.45 kg/h), lactose (2472.24 kg/h) and GOS (Vivinal GOS; concentrated liquid at 75 wt %, flowrate 1084.8 kg/h) were added. GOS is added as the final ingredient during the extrusion process. Extrusion is performed at 65° C. at a flowrate of 9753.68 kg/h. The extrudate as obtained contained 80% TS and was ready for drying using known technologies, such as flash or vacuum belt drying, to end up with a nutritional composition with a % TS of 97.5 which was produced at a flowrate of 8003.0 kg/h. No dry blending of further ingredients was required. A powdered composition was obtained that was ready for packaging.

Example 3

Data mentioned in example 1 and 2 were generated using the gPROMS gFormulatedProducts 1.2.2 simulation model from Process Systems Enterprise (PSE). Mass balance models used were steady state, meaning no accumulation in time is applied. Models were applied on a macro level without applying any discretization method.

For evaporation/concentration the mass balance of equation (1) was applied.

$$0 = \varphi_m^{in} - \varphi_m^{out} - \varphi_m^{evap} \quad (1)$$

It states that the amount of evaporated water or water otherwise removed $$\left(\frac{kg}{s}\right)$$

from a Steam, plus the outlet from a stream should be equal to an inlet stream. From this perspective the outlet total solids $$\left(\frac{kg}{kg}\right)$$

were calculated via equation (2):

$$x_{solids}^{out} = \frac{x_{solids}^{in} \varphi_m^{in}}{\varphi_m^{out}} \quad (2)$$

This was applied under the assumption that extracted water, extracted via evaporation or any other technology, is pure water.

The same approach was used for mixing of different streams either within compounding (i.e. preparation of an aqueous mixture prior to heat treatment step a), fat injection (i.e. step b) or extrusion (step d). Equation (3) applies for the total mass balance:

$$\varphi_m^{out} = \sum_{i=1}^{N_{streams}} \varphi_{m_i}^{in} \quad (3)$$

The solids outlet of any mixer and/or extruder was calculated by adapting equation (3) in case multiple inlet streams were applied:

$$x_{solids}^{out} = \frac{\sum_{i=1}^{N_{streams}} x_{solids,i}^{in} \varphi_{m_i}^{in}}{\varphi_m^{out}} \quad (4)$$

For the drying step, independent of the drying technology, equations 1 and 2 were applied to calculate the water evaporation capacity.

These equations were applied in a flowsheet construction. The information passed between models in a product flow are the mass flowrate and the composition (kg/kg).

The invention claimed is:

1. A process for manufacturing an infant formula product comprising the following steps:
    (a) subjecting an aqueous mixture having a protein and a carbohydrate to a heat treatment step,
    (b) mixing the aqueous mixture with a lipid,
    (c) subjecting the aqueous mixture comprising the lipid, the carbohydrate and the heat-treated protein to a homogenization and emulsification step to obtain a homogenized oil-in-water emulsion having a total solids content in the range of 45-68 wt %;
    (d) conveying the homogenized emulsion into an extruder, independently adding digestible carbohydrates and optionally dietary fibres to the extruder downstream of the homogenized emulsion and extruding the contents of the extruder to obtain an extruded material;
    (e) preparing the infant formula product from the extruded material,
    wherein the process is performed at a temperature below 75° C., except for the heat-treatment of step (a).

2. The process according to claim 1, wherein step (e) involves drying and milling of the extruded material.

3. The process according to claim 1, wherein the protein of the infant formula has a weight ratio of whey protein to casein in the range of 9/1 to 1/9.

4. The process according to claim 1, wherein the total solids content of the homogenized oil-in-water emulsion of step (c) is in the range of 53-68 wt %.

5. The process according to claim 1, wherein the digestible carbohydrates are added in step (d) as a dry powder and the dietary fibres are added as a dry powder or as a concentrated liquid.

6. The process according to claim 5, wherein the digestible carbohydrates are lactose and/or maltodextrin.

7. The process according to claim 1, wherein the heat treatment of step (a) is designed to obtain a microbial safe protein.

8. The process according to claim 1, wherein the aqueous mixture of step (a) has a total solids content in the range of 15-40 wt %.

9. The process according to claim 1, wherein the aqueous mixture subjected to step (b) has a total solids content in the range of 35-60 wt % prior to the mixing with the lipid.

10. The process according to claim 1, wherein the total solids content of the aqueous mixture obtained in step (a) is increased prior to mixing with the lipid.

11. The process according to claim 1, wherein skim milk and/or whey protein concentrate (WPC) are used as source of the protein and carbohydrate of the aqueous mixture subjected to step (a).

12. The process according to claim 1, wherein the carbohydrate in step (a) comprises lactose, which lactose constitutes between 15 and 75 wt % of the total lactose contents of the infant formula product prepared in step (e) is present in the aqueous mixture of step (a), and wherein the remainder of the lactose is added during step (d) and/or step (e).

13. The process according to claim 1, wherein the digestible carbohydrate that is added during step (d) comprises lactose and the amount of lactose added during step (d) lies between 25 and 80 wt % (on dry weight basis) of the total amount of lactose contained in the infant formula product obtained in step (e).

14. The process according to claim 1, wherein the digestible carbohydrate that is added during step (d) comprises no lactose.

15. An infant formula product obtainable by the process according to claim 1.

16. The infant formula product according to claim 15, which is an infant formula, a follow-on formula, a toddler milk or a growing-up milk.

* * * * *